United States Patent
Pauley et al.

(10) Patent No.: US 6,435,424 B1
(45) Date of Patent: Aug. 20, 2002

(54) PRESSURE WASHER WITH DUTY CYCLE TEMPERATURE CONTROLLER AND METHOD

(75) Inventors: Stephen J. Pauley; Calvin W. Krefft, both of Palm Harbor, FL (US); Erik K. Worm, Aalborg (DK)

(73) Assignee: Alto U.S. Inc., Chesterfield, MO (US)

( * ) Notice: Subject to any disclaimer, the term of this patent is extended or adjusted under 35 U.S.C. 154(b) by 0 days.

(21) Appl. No.: 09/626,991

(22) Filed: Jul. 27, 2000

(51) Int. Cl.[7] .............................. B05B 1/24; B05B 7/16; B05C 1/00

(52) U.S. Cl. ....................................... 239/128; 239/135

(58) Field of Search ........................... 239/70, 75, 135, 239/133, 124, 128, 10, 1; 137/624.11, 320, 334; 134/105, 107

(56) References Cited

U.S. PATENT DOCUMENTS

| | | | |
|---|---|---|---|
| 4,057,438 A | 11/1977 | Mainord | 134/2 |
| 4,324,207 A * | 4/1982 | Leuthard | 122/448 B |
| 4,689,089 A | 8/1987 | Eberhardt, Jr. et al. | 134/18 |
| 4,845,341 A | 7/1989 | Rae | 219/497 |
| 4,925,386 A | 5/1990 | Donnelly et al. | 431/28 |
| 4,935,606 A | 6/1990 | Geary | 219/501 |
| 4,978,292 A | 12/1990 | Donnelly et al. | 431/75 |
| 5,003,161 A | 3/1991 | Geary | 219/501 |
| 5,025,134 A | 6/1991 | Bensoussan et al. | 219/494 |
| 5,038,676 A | 8/1991 | Davis et al. | 99/330 |
| 5,089,689 A | 2/1992 | Kidder et al. | 219/506 |
| 5,089,994 A | 2/1992 | Harlan et al. | 367/73 |
| 5,324,915 A | 6/1994 | Adams et al. | 219/494 |
| 5,332,884 A | 7/1994 | Bailey | 219/494 |
| 5,352,866 A | 10/1994 | Cartwright et al. | 219/497 |
| 5,416,300 A | 5/1995 | Hickl et al. | 219/262 |
| 5,446,348 A | 8/1995 | Michalek et al. | 315/209 |
| 5,533,671 A * | 7/1996 | Baer | 239/10 |
| 5,582,755 A | 12/1996 | Maher, Jr. et al. | 219/492 |
| 5,595,514 A | 1/1997 | Maher, Jr. et al. | 364/569 |
| 5,642,742 A | 7/1997 | Noren et al. | 134/57 |
| 5,681,400 A | 10/1997 | Brady et al. | 134/18 |
| 5,706,717 A | 1/1998 | Barner | 99/330 |
| 5,739,505 A | 4/1998 | Hasegawa et al. | 219/494 |
| 5,745,043 A * | 4/1998 | Lemke et al. | 340/815.4 |
| 5,750,961 A | 5/1998 | Schug et al. | 219/497 |
| 5,776,260 A | 7/1998 | Dunn et al. | 134/18 |
| 5,792,276 A | 8/1998 | Driessen | 134/18 |
| 5,794,634 A | 8/1998 | Noren et al. | 134/57 |
| 5,803,099 A | 9/1998 | Sakuta et al. | 134/56 |
| 5,826,520 A | 10/1998 | Mainord | 110/342 |
| 5,844,207 A | 12/1998 | Allard et al. | 219/497 |

(List continued on next page.)

Primary Examiner—William C. Doerrler
Assistant Examiner—Davis Hwu
(74) Attorney, Agent, or Firm—Senniger, Powers, Leavitt & Roedel (57) ABSTRACT

A pressure washer for use by an operator. A heat exchanger has a water input adapted to connect to a water source and has a water output providing discharge water. A water pump supples water to the heat. A temperature selector is responsive to operator. A burner in thermodynamic communication with the heat exchanger applies heat to the heat exchanger and the water in the heat exchanger. The burner has a fuel input connecting a fuel source to the burner. A fuel switch selectively allows fuel from the fuel source to be supplied to the combustion chamber via the fuel input. A duty cycle timer has a uniform duty cycle and is energized when water flows through the heat exchanger. The duty cycle timer is responsive to the temperature selection switch to vary its duty cycle as a function of the operator input provided to the temperature selector. The duty cycle timer controls the fuel switch to supply fuel to the combustion chamber according to the duty cycle of the duty cycle timer whereby the duty cycle timer controls the burner and thereby controls temperature of the water in the heat exchanger. Preferably, the duty cycle has a minimum on time to maintain burner efficiency.

16 Claims, 4 Drawing Sheets

U.S. PATENT DOCUMENTS

| | | |
|---|---|---|
| 5,844,208 A | 12/1998 | Tustaniwskyj et al. ..... 219/494 |
| 5,845,225 A | 12/1998 | Mosher ...................... 701/102 |
| 5,866,880 A | 2/1999 | Seitz et al. ................. 219/483 |
| 5,873,947 A | 2/1999 | Mohindra et al. ............ 134/18 |
| 5,882,589 A | 3/1999 | Mariotti ....................... 422/28 |
| 5,901,717 A | 5/1999 | Dunn et al. ................... 134/56 |
| 5,968,393 A | 10/1999 | Demaline ................... 219/492 |
| 5,981,916 A | 11/1999 | Griffiths et al. ............. 219/492 |
| 6,005,228 A | 12/1999 | Dickens et al. ............. 219/483 |
| 6,018,150 A | 1/2000 | Maher, Jr. ................... 219/497 |
| 6,021,788 A | 2/2000 | King ......................... 134/25.2 |
| 6,041,795 A | 3/2000 | Steiner ........................ 134/56 |
| 6,060,698 A | 5/2000 | Petrides et al. ............. 219/492 |
| 6,074,491 A | 6/2000 | McClure et al. .............. 134/10 |
| 6,080,971 A | 6/2000 | Seitz et al. ................. 219/483 |
| 6,084,216 A | 7/2000 | Slegt et al. ................. 219/497 |
| 6,105,192 A | 8/2000 | Deiterman et al. .......... 15/50.1 |

* cited by examiner

PRESSURE WASHER WITH DUTY CYCLE TEMPERATURE CONTROLLER AND METHOD

BACKGROUND OF THE INVENTION

The invention generally relates to pressure washers. In particular, the invention relates to a pressure washers having a duty cycle heater controller for supplying heated water.

Hot water pressure washers provide cleaning advantages over pressure washers that supply wash water at source temperature. Prior art pressure washers typically require the use of a thermostat control including a water temperature sensor for providing feedback to a controller to achieve temperature control. Unfortunately, such thermostat control systems typically provide relatively unstable temperature control. One of the reasons for such relatively unstable control is that the thermostat typically uses a temperature sensor to sense the temperature of the pipe in which the water flows. Thus, the temperature feedback provided to the thermostat-based control system lags the actual water temperature due to (1) the time it takes for the flowing water to heat or cool the pipe, (2) the time it takes the pipe to heat or cool the temperature sensor housing, and finally (3) the time it takes the housing to heat or cool the temperature sensor. Accordingly, adjustments to the burner used to heat the water are often poorly correlated with the desired output temperature, and result in undesirable overshoot and/or undershoot in the output water temperature.

For these reasons, an improved, highly accurate heater for hot water pressure washers is desired. The results obtained with such a pressure washer benefits from a more closely controlled water temperature range.

SUMMARY OF THE INVENTION

The invention meets the above needs and overcomes the deficiencies of the prior art by providing an improved temperature controller for a hot water pressure washer. This is accomplished by a less expensive, yet more accurate, calculated duty cycle burner controller system than the traditional thermostat control system. Advantageously, the present invention reduces costs by eliminating the need for a temperature sensor and thermostat, two typically costly items. Further, by eliminating the need to rely on a temperature sensor which introduces inherent delays, the improved temperature sensor provides a more constant output water temperature. Also, by controlling temperature by controlling the burner duty cycle, the burner "on time" may be set at a fixed time interval with the off interval varied. Selecting an on time of suitable duration ensures a cleaner burn, which reduces burner soot and improves the reliability of the pressure washer while reducing pollution.

In one form, the invention comprises a pressure washer for use by an operator. A heat exchanger has a water input adapted to connect to a water source and has a water output providing discharge. A cycle timer is responsive to the flow of water flow through the heat exchanger. A burner in thermodynamic communication with the heat exchanger applies heat to the heat exchanger and to the water in the heat exchanger. The burner has a fuel input connecting a fuel source to the burner. A fuel switch is responsive to the cycle timer. The fuel switch selectively allows fuel from the fuel source to be supplied to the burner via the fuel input, whereby the cycle timer controls the duty cycle of the fuel switch and thereby controls temperature of the water in the heat exchanger.

In another form, the invention comprises a pressure washer for use by an operator. A heat exchanger has a water input adapted to connect to a water source and has a water output providing discharge water. A water pump supples water to the heat exchanger. A temperature selector is responsive to operator. A burner in thermodynamic communication with the heat exchanger applies heat to the heat exchanger and the water in the heat exchanger. The burner has a fuel input connecting a fuel source to the burner. A fuel switch selectively allows fuel from the fuel source to be supplied to the burner via the fuel input. A duty cycle timer has a uniform duty cycle and is energized when water flows through the heat exchanger. The duty cycle timer is responsive to the temperature selection switch to vary its duty cycle as a function of the operator input provided to the temperature selector. The duty cycle timer controls the fuel switch to supply fuel to the burner according to the duty cycle of the duty cycle timer whereby the duty cycle timer controls the burner and thereby controls temperature of the water in the heat exchanger.

In yet another form, the invention comprises a pressure washer for use by an operator, as follows. A heat exchanger has a water input adapted to connect to a water source and has a water output providing discharge water. A water pump supplies water to the heat exchanger. A temperature selector is responsive to operator input. A burner in thermodynamic communication with the heat exchanger applies heat to the heat exchanger and the water in the heat exchanger. The burner has a fuel input connecting a fuel source to the burner. A fuel switch selectively allows fuel from the fuel source to be supplied to the burner via the fuel input. A processor is responsive to the temperature selection switch to vary the duty cycle of the fuel switch as a function of the operator input provided to the temperature selector.

In another form, the invention is a method of providing pressurized, heated water comprising the steps of:

supplying water at a flow rate through a heat exchanger having a water input adapted to connect to a water source and having a water output providing discharge water; and applying heat to the heat exchanger at a duty cycle which is a function of the flow rate of the water and which is a function of a desired temperature of the discharge water.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
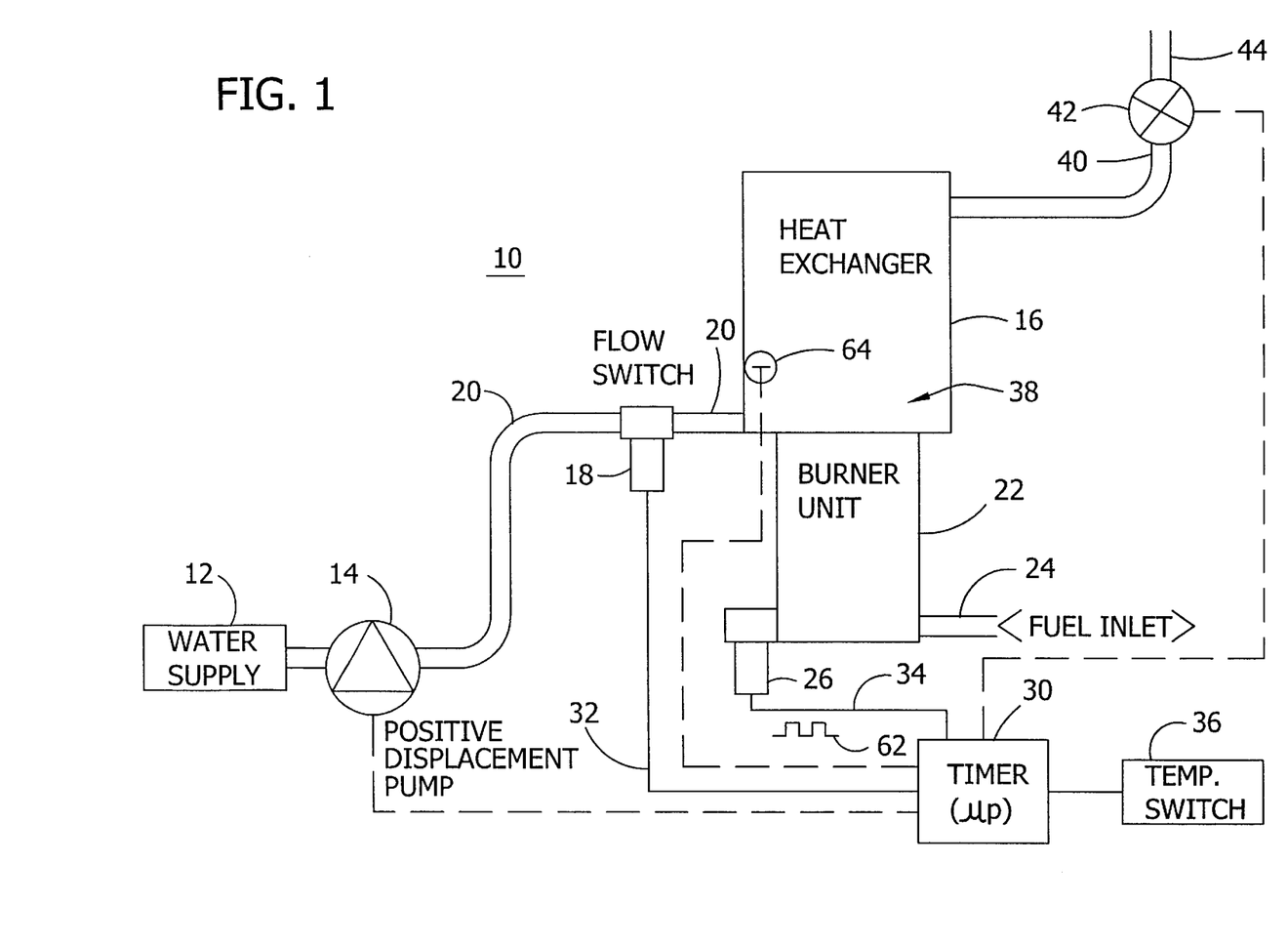
FIG. 1 is schematic diagram partially in block form of a hot water pressure washer having an improved temperature control according to the present invention.

Referring now to the drawings, FIG. 1 is a schematic diagram of a hot water pressure washer 10 using an improved temperature control system. As shown therein, a water supply 12 is connected to a positive displacement water pump 14. For example, the pump may be model number TS 1811 manufactured by Interpump of Italy. The pump 14 provides water to a heat exchanger 16 such as a 60'–100' section of layered, folded pipe through which the water flows. A water flow switch 18 is positioned in an input water supply line 20 between the water pump 14 and the heat exchanger 16. The water flow switch 18 senses water flow in the input water supply line 20. For example, the water flow switch may be model number ST 6 manufactured by Sutner of Italy.

A burner unit 22 is positioned in a thermodynamic relationship with heat exchanger 16. The burner unit 22 receives burner fuel from a fuel source (FIG. 2) via a fuel inlet line 24. A fuel solenoid 26 (e.g., an oil valve) associated with burner unit 22 and the fuel inlet line 24 controls, in part, the flow of fuel into burner unit 22. The fuel solenoid 26 may also be referred to as a fuel switch. For example, the burner unit may be model number AFG manufactured by R.W. Beckett Corp. of Elyria, Ohio.

A timer circuit 30 is connected to water flow switch 18 via a line 32. The timer circuit 30 is also connected to fuel solenoid 26 via a line 34. A temperature selection switch 36 (e.g., a potentiometer) associated with timer circuit 30 allows operators to select a desired water temperature.

Hot water 38 leaves heat exchanger 16 via a water discharge line 40. An operator controlled discharge valve 42 is positioned between the water discharge line 40 and a water output 44.

Figure 2:
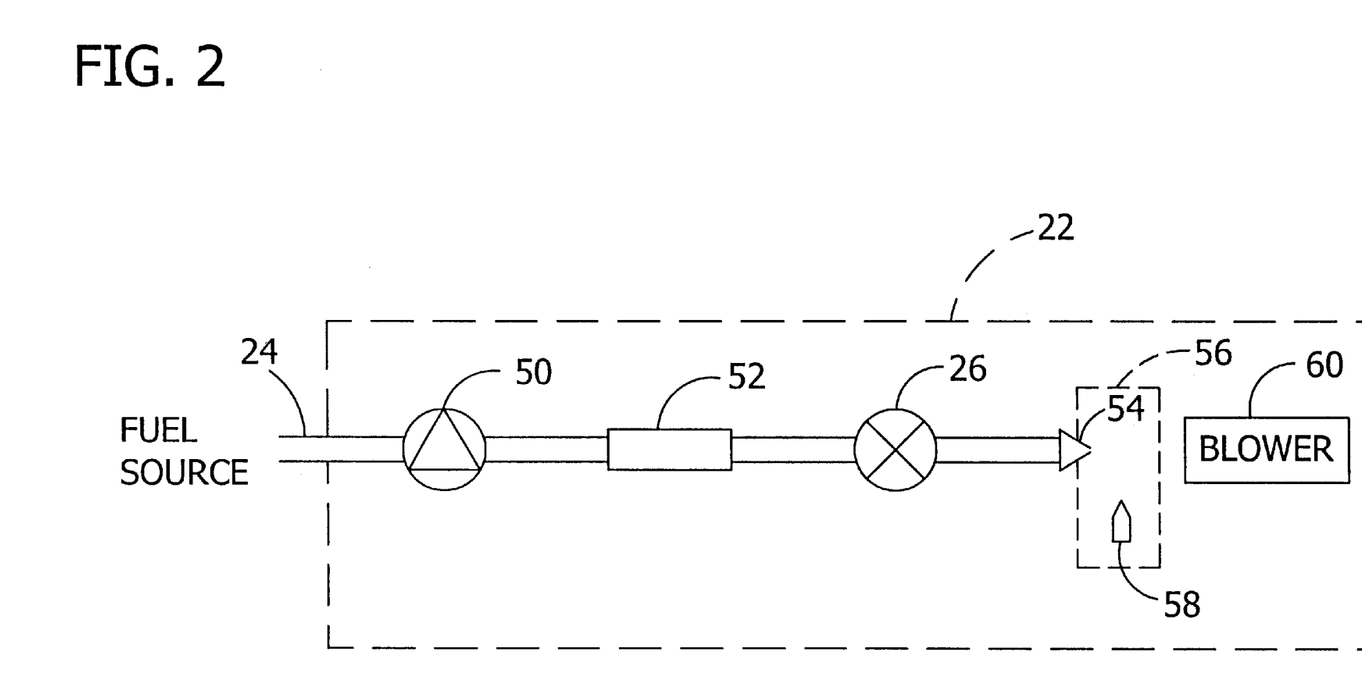
FIG. 2 is a schematic diagram of the burner unit of FIG. 1.

FIG. 2 is a schematic diagram of burner unit 22, showing specific aspects in greater detail. Fuel is supplied to burner unit 22 from a fuel source via fuel inlet line 24. As indicated above, fuel solenoid 26 controls the flow of fuel into burner unit 22. A fuel pump 50 is connected in-line with fuel inlet line 24. A pressure regulator 52 associated with the fuel pump 50 is positioned after fuel pump 50 and in-line with fuel inlet line 24. Fuel solenoid 26 is likewise positioned in-line with fuel inlet line 24 and after the pressure regulator 52. A fuel atomizing nozzle 54 is connected to the output of the combination of the fuel pump 50 and the pressure regulator 52. The fuel atomizing nozzle 54 is also located such that fuel is distributed from nozzle 54 into a combustion chamber 56. An ignition source 58 is positioned inside the combustion chamber 56. In the preferred embodiment shown in FIG. 2, the ignition source 58 preferably comprises an electronic spark igniter generating a plasma spark from a high voltage, open circuit transformer. Alternatively, the ignition source may be a pilot which is fed from a separate pilot fuel line (not shown). Finally, a blower 60 is positioned adjacent to combustion chamber 56 to supply an air stream to burner unit 22.

Referring now to FIGS. 1 and 2 together, in use, when an operator desires hot, pressurized water, the operator depresses a trigger or similar device (not shown) on the pressure washer. When the trigger is depressed, discharge valve 42 opens thereby allowing hot water 38 to flow through the water output 44, via water discharge line 40. More particularly, when discharge valve 42 is opened, water pump 14 pumps water from water supply 12, through input water supply 20, into heat exchanger 16. Preferably, water pump 14 supplies a fixed amount of water per unit of time into heat exchanger 16. When flow switch 18 senses water flowing through input water supply line, it energizes timer circuit 30 via line 32.

The operator selects a desired wash water temperature using temperature switch 36. It should be understood that temperature switch 36 may comprise a simple switch, such as, for example a "hot/cold" switch. Temperature switch 36 may also comprise a complex switch mechanism, allowing for various gradations of water temperature selection. As will be explained in greater detail below, timer circuit 30 preferably outputs a square wave solenoid signal 62 (see FIG. 3) that has a duty cycle representative of the temperature identified by temperature switch 36. The square wave signal 62 is output on line 34 to fuel solenoid 26. In particular, square wave signal 62 causes fuel solenoid 26 to selectively open and close in a synchronous fashion, thereby selectively controlling the fuel flow into burner unit 22. As can now be appreciated, by selectively controlling the fuel flow into burner unit 22, the firing rate of the burner is likewise selectively controlled thereby controlling the amount of heat applied to the heat exchanger, and, consequently, to the water in the heat exchanger.

Advantageously, by controlling the duty cycle of fuel solenoid 26, timer circuit 30 also controls the amount of heat supplied to the water 38 in combustion chamber 16, without the use of a temperature sensor providing feedback to a control system. This is made possible by recognizing and utilizing the known or determinable thermodynamic characteristics of the pressure washer heating system. For instance, the capacity of heat exchanger 16 in terms of water volume is typically a fixed and known value for a given pressure washer 10. If water pump 14 supplies water at a predetermined fixed rate (such as would be the case with a positive displacement pump), the amount of water flowing into (and out of) heat exchanger 16 is also known. It is to be understood that the invention may be used with other pump types, such as, for example, centrifugal pumps. Further, heat exchanger 16 is preferably built out of steel pipe or another suitable material having a known heat transfer characteristic. Finally, the heat generated in combustion chamber 56 can be predetermined by controlling the fuel pressure via fuel pump 50, pressure regulator 52, and nozzle 54. Therefore, the amount of heat transferred to the water 38 in heat exchanger 16 per unit of burner "on time" may also be predetermined. Thus, by controlling the duty cycle of fuel solenoid 26, the temperature of hot water 38 may be precisely and predictably controlled empirically without the use of any temperature sensor or feedback control system. Alternatively, or in addition, such control can be determined by testing because such units have predictable heat characteristics. An Appendix provides exemplary equations, calculations, and test data associated with determining the firing rate of an oil fired burner according to the invention.

In general, the invention includes a method of providing pressurized, heated water, which method can be implemented by a processor, as noted below. The method comprises the steps of:

supplying water at a flow rate through a heat exchanger having a water input adapted to connect to a water source and having a water output providing discharge water; and applying heat to the heat exchanger at a duty cycle which is a function of the flow rate of the water and which is a function of a desired temperature of the discharge water.

Figure 3:
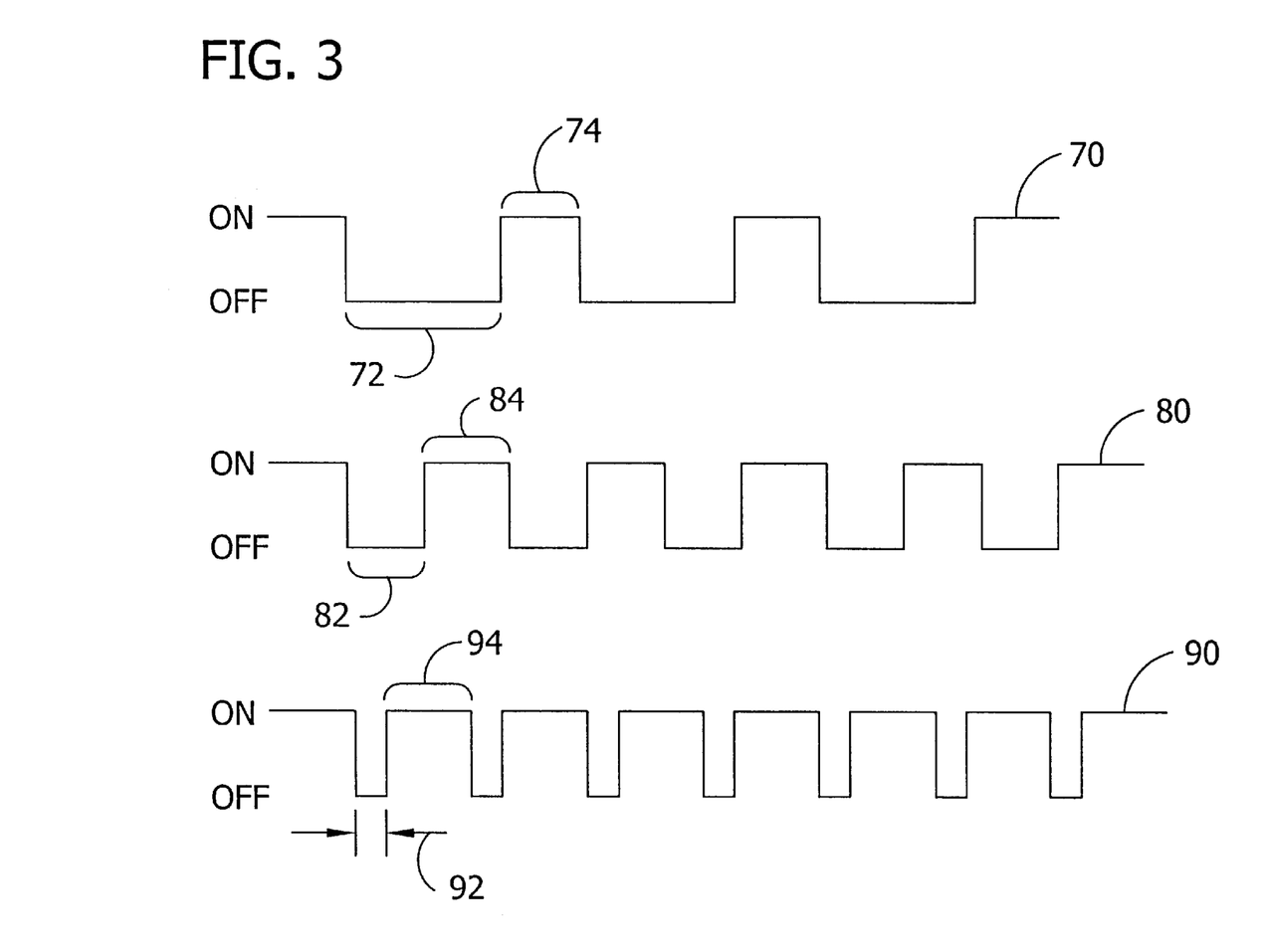
FIG. 3 is a timing diagram of representative duty cycle time curves for three desired temperature control settings according to the invention.

FIG. 3 is a timing diagram that illustrates square wave 62 at three representative duty cycles for controlling the on time and off time of fuel solenoid 26. FIG. 3 illustrates the waveform for three desired water temperature settings. These waveforms would be generated by the temperature switch 36 in three different positions. Although switch 36 is continuously variable, it may have pre-set positions to generate various waveforms.

Waveform 70 represents a burner duty cycle associated with lukewarm water. As can be appreciated from waveform 70, the burner off time 72 is twice as long as the burner on time 74, thus heat is applied to heat exchanger 16 by burner unit 22 only one-third of the time while water is flowing, thereby producing relatively cooler water. Similarly, waveform 80 represents a burner duty cycle associated with warm water. In the case of waveform 80, the burner off time 82 equals the burner on time 84 during water flow. Waveform 90 reflects a representative burner duty cycle associated with hot water. As illustrated by waveform 90, when hot water is desired, the burner off time 92 is 1/10th of burner on time 94 during water flow. Accordingly, if burner on time is 10 seconds and hot water is desired, timer circuit 30 causes fuel solenoid 26 to cycle such that the burner burns continuously for 10 seconds, followed by 1 second during which the burner does not burn.

It should be understood that burner on time 74, 84, 94 for any given waveform (e.g., waveforms 70, 80, 90, respectively) may be any desirable number of seconds. Preferably, however, the on time is fixed for any given temperature setting or set to a minimum so that the temperature of the water 38 is controlled by varying the burner off time (e.g., 72, 82, 92) which may be a function of burner on time. A fixed on time is desirable because on time may be selected that is of sufficient (or minimum) duration to ensure a clean burn. Those skilled in the art will recognize that burn times of insufficient duration can result in incomplete combustion. Incomplete combustion, in turn, results in soot deposits in the burner. Soot deposits lower burner efficiency, increase pollution associated with pressure washer operation, and can cause burner failures such as ignition failure. Thus, timer circuit 30 not only allows for improved temperature control without the use of thermostats, temperature sensors, and feedback control, it also allows for more predictable, efficient, and reliable burner operation. It is to be understood, however, that improved temperature control can be obtained with this invention without using a fixed burner on time, as described above. Further, although the improved temperature control characteristics of the pressure washer of the present invention may be achieved with varying burner on/off times, it is preferable that a minimum on time be selected that is not less than the time necessary to ensure clean and sufficiently complete fuel combustion.

Referring again to FIG. 1, it is also contemplated that the timer 30 may be replaced by a processor such as a microprocessor ($\mu$P). In addition, as shown by the dashed lines, the processor would control the pump 14 (which could have a variable flow rate), and/or control the discharge valve (which could have a variable discharge rate) and/or control the fuel solenoid (which could be replaced by a variable rate fuel flow control). In addition, the processor be responsive to the flow switch 18 and may optionally be responsive to a temperature sensor 64 positioned adjacent the heat exchanger 16 for sensing a temperature corresponding to the water temperature and wherein the processor is responsive to the temperature sensor to vary the duty cycle of the fuel switch as a function of a temperature sensed by the temperature sensor. Also, the temperature switch 36 could be replaced by a keyboard for receiving operator input (e.g., a number pad for keying in the desired temperature of the output water. In this configuration, the processor would calculate the necessary duty cycle of the fuel solenoid 26 (or flow rate of the variable rate fuel flow control) to achieve the desired temperature as a function of the actual rate of flow of water through the heat exchanger as provided by the controlled pump 14.

In general, the pressure washer would be used as follows. An operator would select a temperature by controlling a temperature selector such as switch 36 responsive to operator input. When the processor senses or commands that water is flowing through the heat exchanger 16, the processor responds to the temperature selector to vary the duty cycle of the fuel switch 26 as a function of the operator input provided to the temperature selector and/or as a function of the water flow rate. The processor may sense water flow via flow switch 18 or it may command water flow by controlling pump 14 or both.

Figure 4:
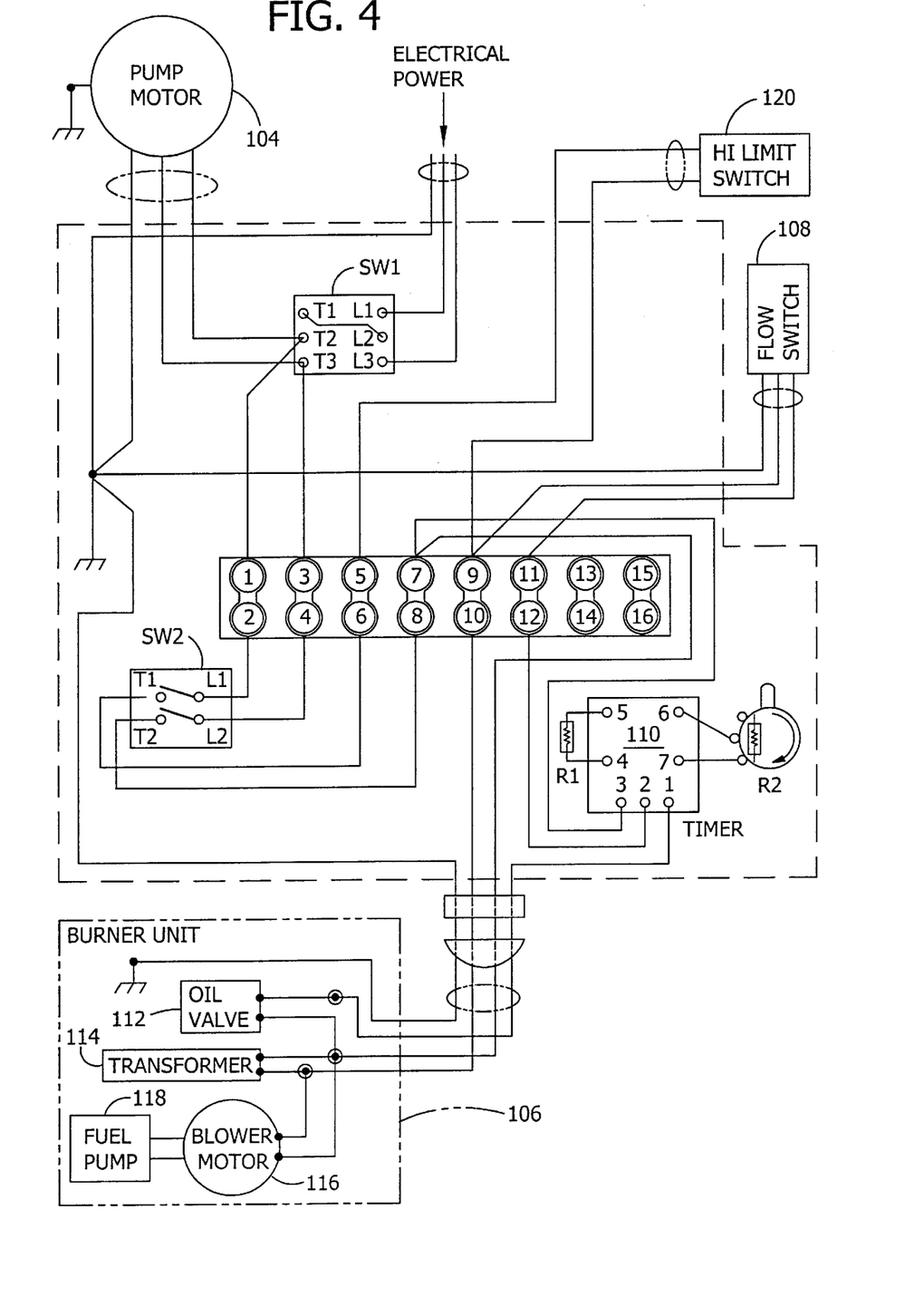
FIG. 4 is a schematic circuit diagram of one preferred embodiment of the temperature control according to the invention.

Referring now to FIG. 4, electrical power is provided to a manual switch SW1 controlled by the operator. The present invention may be used with various electrical power sources, including AC (single or multi-phase) and DC power. When closed, switch SW1 provides power to a water pump motor 104 for pumping the water through the pressure washer. Switch SW2 is a double pole, single throw (DPST) switch which, when closed by the operator, energizes a burner unit 106 to generate heat as follows. In particular, a flow switch 108 in line with the water detects water flow and closes. When the flow switch 108 is closed, a timer 110 is energized. For example, the timer may be model number KSDR manufactured by SSAC of Baldwinsville, N.Y. Timer 110 has a resistor R1 (e.g., 0.5 M$\Omega$) which defines and controls its on time (e.g., 10 seconds) and has a variable resistor R2 (e.g., a potentiometer controlled by the operator and having a range of from 0$\Omega$ to 1 M$\Omega$) which defines and controls its off time (e.g., a minimum off time of 1 second and a maximum off time of 20 seconds). Thus, the waveforms of FIG. 3 may be achieved by choosing the values of R1 and R2.

When switch SW2 is closed, a transformer 114, a blower motor 116, and flow switch 108 are energized. As can be appreciated from FIG. 4, when flow switch 108 is energized, timer 110 does not necessarily begin to execute its timing cycles. Thus, when the transformer 114 and flow switch 108 are energized, the system is placed in a ready state such that if the operator of the pressure washer causes water flow, the flow switch 108 closes and timer 110 is activated (begins timing) and transformer 114 provides a spark to ignite the oil being supplied by the oil valve 112. Also, when the switch SW2 is closed, the motor 116 is energized to drive a squirrel cage fan (not shown) to supply air to the combustion chamber and to drive a fuel pump 118 for pressurizing the oil in the oil supply line so that the oil can be injected into a combustion chamber. When the timer 110 is on, an oil valve 112 of the burner unit 106 is opened to allow the pressurized oil to flow so that oil is supplied into the combustion chamber for burning. As a result, oil valve 112 intermittently opens and closes to supply oil to the combustion chamber at the duty cycle of the timer 110 as defined by resistors R1 and R2. A high limit switch 120 may be positioned in the discharge water stream to monitor water temperature. The switch 120 is in series with switch SW2 and open circuits when the water temperature exceeds a predefined maximum (e.g., 212° F.) thereby de-energizing the burner unit 106.

As can be seen, the invention avoids the need for a thermostat and temp sensor to control water temperature because it is the duty cycle of the burner unit 106 as it heats flowing water that determines the output water temperature. In addition, the burner unit provides a cleaner burn with reduced pollution because resistor R1 is chosen to provide a minimum on time to insure efficient and complete oil burning cycles. Also, the invention provides improved reliability and improved efficiency by employing fewer components. The fewer parts also make the system of the invention easier to maintain and provide it with improved reliability. The system of the invention also supplies water at a substantially constant temperature due to reduced hysteresis it provides as compared to the use of a temperature sensor with feedback.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

APPENDIX

Equation 1 reflects a formula for determining the necessary firing rate for an oil fired burner.

$$\frac{(V)(60)(8.3)(\Delta T)}{(E)(HV)} = FR \quad [1]$$

Where:

V is the volume of water in gallons per minute (GPM);

60 minutes per hour;

8.3 lbs. per gallon of water;

ΔT is the desired rise in temperature (in degrees F.);

E is the estimated or previously measured efficiency of the heat exchanger;

HV is the heating value of the oil in BTUH per gallon; and

FR is the firing rate in gallons per hour (GPH) input of oil

Equation 2 is an exemplary base-line calculation for a 4 GPM pressure washer with (i) a 135° temperature rise; (ii) a baseline efficiency of 0.75; and (iii) a 140,000 BTUH per gallon heating value. Equation 2 reflects a 100% duty cycle, so there is no off cycle time.

$$\frac{(4)(60)(8.3)(135)}{(.75)(140,000)} = 2.56 \ (100\% \ \text{input/duty cycle}) \quad [2]$$

Assuming, however, that the efficiency of the heat exchanger will decrease due to heat loss during the off cycle time, a 70% efficiency model was used and tested. Equation 3 reflects the calculation of the theoretical firing rate for a 100°ΔT. Equation 4 reflects the calculation of the theoretical firing rate for a 60°ΔT.

$$\frac{(4)(60)(8.3)(100)}{(.70)(140,000)} = 2.03 \ (79.3\% \ \text{input/duty cycle}) \quad [3]$$

$$\frac{(4)(60)(8.3)(60)}{(.70)(140,000)} = 1.22 \ (47.7\% \ \text{input/duty cycle}) \quad [4]$$

Testing data was collected and the calculations were verified using a Versa 4200 pressure washer, operating at 4 GPM, 2000 PSI. Inlet water temperature was measured at 77° F.

|  | ON TIME | OFF TIME | HIGH TEMP | LOW TEMP | MEDIAN |
| --- | --- | --- | --- | --- | --- |
| Test 1 | 10 | 2 | 181.4° | 180.8° | 181.1° |
| Test 2 | 10 | 10 | 140° | 135° | 137.5° |

As shown by the above test data, the actual ΔT observed at an 83.3% duty cycle in Test 1 was 104°. Equation 5 reflects the determination of the theoretical firing rate for a 104°ΔT. As can be seen by equation 5, the firing rate is 2.11 GPH, which equates to 82.5% of the 2.56 GPH baseline (e.g., 100%) input calculated in equation 2. Thus, the difference between the actual duty cycle (83.3%) and the theoretical duty cycle (82.5%) was less than 1%, at 104° ΔT.

$$\frac{(4)(60)(8.3)(104)}{(.70)(140,000)} = 2.11 \ (82.5\% \ \text{input/duty cycle}) \quad [5]$$

Similarly, with respect to Test 2, the actual ΔT observed at a 50% duty cycle was 60.50°. As illustrated by equation 6, the theoretical firing rate for a 60.5°ΔT is 1.23. This equates to 48%, which is 2% less than the actual duty cycle (50%) used in Test 2.

$$\frac{(4)(60)(8.3)(60.5)}{(.70)(140,000)} = 1.23 \ (48\% \ \text{input/duty cycle}) \quad [6]$$

What is claimed is:

1. A pressure washer for use by an operator comprising:
   a heat exchanger having a water input adapted to connect to a water source and having a water output providing discharge water;
   a cycle timer responsive to the flow of water through the heat exchanger;
   a burner in thermodynamic communication with the heat exchanger for applying heat to the heat exchanger and to the water in the heat exchanger, said burner having a fuel input connecting a fuel source to the burner; and
   a fuel switch responsive to the cycle timer, said fuel switch selectively allowing fuel from the fuel source to be supplied to the burner via the fuel input, whereby the cycle timer controls a duty cycle of the fuel switch and thereby controls temperature of the water in the heat exchanger.

2. The pressure washer of claim 1 further comprising a water flow switch sensing water flow into the heat exchanger and wherein the cycle timer is responsive to the water flow switch such that the cycle timer is energized when the water flow switch senses water flow into the heat exchanger.

3. The pressure washer of claim 2 wherein the burner further comprises:
   an ignition source igniting the fuel supplied from the fuel source to the burner;
   a fuel pump associated with the fuel input, said fuel pump selectively controlling a quantity of fuel supplied from the fuel source to the burner; and
   a nozzle associated with the fuel input, said nozzle atomizing the fuel supplied from the fuel to the burner.

4. The pressure washer of claim 1 wherein the cycle timer comprises a microprocessor.

5. A pressure washer for use by an operator comprising:
   a heat exchanger having a water input adapted to connect to a water source and having a water output providing discharge water;

a cycle timer responsive to the flow of water flow through the heat exchanger;

a burner in thermodynamic communication with the heat exchanger for applying heat to the heat exchanger and to the water in the heat exchanger, said burner having a fuel input connecting a fuel source to the burner;

a fuel switch responsive to the cycle timer, said fuel switch selectively allowing fuel from the fuel source to be supplied to the burner via the fuel input, such that the cycle timer controls the duty cycle of the fuel switch and thereby controls temperature of the water in the heat exchanger;

a water flow valve for selectively controlling the flow of water through the heat exchanger, said water flow valve having an open state in which water flows through the heat exchanger;

a water pump supplying water to the heat exchanger when the water flow valve is in the open state;

a water flow switch sensing water flow into the heat exchanger; and wherein said cycle timer is responsive to the water flow switch and is energized when the water flow switch senses water flow into the heat exchanger.

6. The pressure washer of claim 5 wherein the water pump supplies a fixed amount of water per unit of time when the water flow valve is in the open state.

7. The pressure washer of claim 5 further comprising a temperature selection switch setting a desired water temperature.

8. The pressure washer of claim 7 wherein the temperature selection switch has an upper temperature setting and a lower temperature setting and the cycle timer is responsive to the temperature selection switch, and wherein the cycle timer causes the fuel switch to supply more fuel to the burner when the temperature selection switch is in the upper setting and less fuel to the burner when the temperature selection switch is in the lower temperature setting.

9. The pressure washer of claim 5 wherein the cycle timer comprises a duty cycle timer having a uniform duty cycle.

10. The pressure washer of claim 9 wherein the duty cycle has an off time and a minimum on time and the temperature selection switch varies at least the off time of the duty cycle.

11. The pressure washer of claim 5 wherein the burner further comprises:

an ignition source igniting the fuel supplied from the fuel source to the burner;

a fuel pump associated with the fuel input, said fuel pump selectively controlling a quantity of fuel supplied from the fuel source to the burner; and a nozzle associated with the fuel input, said nozzle atomizing the fuel supplied from the fuel to the burner.

12. The pressure washer of claim 11 further comprising a fuel pressure regulator selectively controlling the fuel pump thereby causing pressure regulated fuel to be supplied to the burner such that the amount of fuel oxidized in the burner per unit of time is a function of the pressure of the fuel supplied.

13. The pressure washer of claim 11 wherein the nozzle further controls a pressure of the fuel supplied from the fuel source to the burner such that the amount of fuel oxidized in the burner per unit of time is a function of a size of the fuel nozzle.

14. A pressure washer for use by an operator comprising:

a heat exchanger having a water input adapted to connect to a water source and having a water output providing discharge water;

a water pump supplying water to the heat exchanger;

a temperature selector responsive to operator input;

a burner in thermodynamic communication with the heat exchanger for applying heat to the heat exchanger and the water in the heat exchanger, said burner having a fuel input connecting a fuel source to the burner;

a fuel switch selectively allowing fuel from the fuel source to be supplied to the burner via the fuel input;

a duty cycle timer having a uniform duty cycle and being energized when water flows through the heat exchanger, said duty cycle timer being responsive to the temperature selection switch to vary its duty cycle as a function of the operator input provided to the temperature selector, and wherein the duty cycle timer controls the fuel switch to supply fuel to the burner according to the duty cycle of the duty cycle timer whereby the duty cycle timer controls the burner and thereby controls temperature of the water in the heat exchanger.

15. The pressure washer of claim 14 wherein the duty cycle has an off time and a minimum on time and the temperature selection switch varies at least the off time of the duty cycle.

16. A pressure washer for use by an operator comprising:

a heat exchanger having a water input adapted to connect to a water source and having a water output providing discharge water;

a water pump supplying water to the heat exchanger;

a temperature selection switch responsive to an operator input indicating a desired temperature of the discharge water;

a burner in thermodynamic communication with the heat exchanger for applying heat to the heat exchanger and the water in the heat exchanger, said burner having a fuel input connecting a fuel source to the burner;

a fuel switch selectively allowing fuel from the fuel source to be supplied to the burner via the fuel input; and a processor being responsive to the temperature selection switch to vary the duty cycle of the fuel switch as a function of the operator input provided to the temperature selector such that the processor controls the duty cycle of the fuel switch as a function of the desired temperature and wherein the duty cycle has an off time and a minimum on time and the temperature selection switch varies at least the off time of the duty cycle.

* * * * *